(12) United States Patent
Becker

(10) Patent No.: US 10,195,954 B2
(45) Date of Patent: Feb. 5, 2019

(54) METHOD FOR NEGOTIATING A CHARGING POWER BETWEEN AN ELECTRIC VEHICLE AND A CHARGING STATION

(71) Applicant: Gernot Becker, Dortmund (DE)

(72) Inventor: Gernot Becker, Dortmund (DE)

(73) Assignee: innogy SE, Essen (DE)

( * ) Notice: Subject to any disclaimer, the term of this patent is extended or adjusted under 35 U.S.C. 154(b) by 261 days.

(21) Appl. No.: 14/862,268

(22) Filed: Sep. 23, 2015

(65) Prior Publication Data

US 2016/0009191 A1 Jan. 14, 2016

Related U.S. Application Data

(63) Continuation of application No. PCT/EP2014/056405, filed on Mar. 31, 2014.

(30) Foreign Application Priority Data

Apr. 2, 2013 (DE) .................. 10 2013 005 507

(51) Int. Cl.
*H02J 7/00* (2006.01)
*B60L 11/18* (2006.01)
*H01M 10/44* (2006.01)
*H02J 7/04* (2006.01)
*B60L 3/00* (2006.01)
(Continued)

(52) U.S. Cl.
CPC .......... *B60L 11/1838* (2013.01); *B60L 3/0023* (2013.01); *B60L 3/04* (2013.01);
(Continued)

(58) Field of Classification Search
CPC .......... H02J 7/0027; H02J 7/007; H02J 7/047; B60L 11/1816; B60L 11/1838
(Continued)

(56) References Cited

U.S. PATENT DOCUMENTS

2009/0195237 A1 8/2009 Feliss et al.
2013/0193914 A1* 8/2013 Gaddam .................. H02J 7/007
320/108
(Continued)

FOREIGN PATENT DOCUMENTS

DE 10 2012 103 213 A1 10/2013
WO WO 2011/012451 A1 2/2011
(Continued)

*Primary Examiner* — Nathaniel Pelton
(74) *Attorney, Agent, or Firm* — Reinhart Boerner Van Deuren P.C.

(57) ABSTRACT

Method for operating a charging station for electric vehicles in which a charging power is negotiated between a charge control device of the electric vehicle and the charging station, the charge control device controls a charging current which is transmitted from the charging station to the electric vehicle in accordance with the charging power negotiated, wherein a continuous power rating and a maximum power of the charging station which is greater than the continuous power rating are determined. In order to optimize the charging power and to accelerate a charging operation, it is proposed that a charging power which is above the continuous power rating and which at most corresponds to the maximum power is first negotiated, that the temperature in the charging station be monitored, and that, when a limit temperature is exceeded, a new charging power which at most corresponds to the continuous power be negotiated.

10 Claims, 2 Drawing Sheets

(51) Int. Cl.
*B60L 3/04* (2006.01)

(52) U.S. Cl.
CPC ....... *B60L 11/1816* (2013.01); *B60L 11/1825* (2013.01); *B60L 11/1846* (2013.01); *H01M 10/44* (2013.01); *H02J 7/007* (2013.01); *H02J 7/0027* (2013.01); *H02J 7/047* (2013.01); *B60L 2230/12* (2013.01); *B60L 2240/36* (2013.01); *B60L 2240/529* (2013.01); *B60L 2240/662* (2013.01); *B60L 2240/80* (2013.01); *H01M 2220/20* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
USPC .......................................................... 320/152
See application file for complete search history.

(56) References Cited

U.S. PATENT DOCUMENTS

2013/0201641 A1\* 8/2013 Soden ..................... B60L 3/04
        361/752
2013/0221918 A1\* 8/2013 Hill ........................... H02J 7/34
        320/109

FOREIGN PATENT DOCUMENTS

WO    WO 2011/127446 A2    10/2011
WO    WO 2012/117743 A1    9/2012

\* cited by examiner

METHOD FOR NEGOTIATING A CHARGING POWER BETWEEN AN ELECTRIC VEHICLE AND A CHARGING STATION

CROSS-REFERENCE TO RELATED PATENT APPLICATIONS

This patent application is a continuation of PCT/EP2014/056405, filed Mar. 31, 2014, which claims priority to German Application No. 10 2013 005 507.5, filed Apr. 2, 2013, the entire teachings and disclosure of which are incorporated herein by reference thereto.

FIELD OF THE INVENTION

The subject-matter relates to a method for operating a charging station for electric vehicles, in which a charging power is negotiated between a charge control device of the electric vehicle and the charging station and the charge control device controls a charging current which is transmitted from the charging station to the electric vehicle in accordance with the negotiated charging power, wherein a continuous power rating and a maximum power of the charging station which is greater than the continuous power rating are determined.

BACKGROUND OF THE INVENTION

The negotiation of a charging power, in particular a charging amperage between an electric vehicle and charging station, is adequately known. In particular with AC charging stations, which are included within the scope of the subject-matter, at least at the beginning of a charging operation a charging power is negotiated by means of corresponding methods. The charge control device of the electric vehicle then controls the charging power, or the charging current, in accordance with the negotiated charging power. The charging station may monitor whether or not the charge control device of the vehicle keeps to the negotiated charging power. In the event of non-compliance, the charging current may be switched off by the charging station.

From the international patent application WO 2011/012451 A1 it is already known to control the charging current in a manner dependent on the temperature of the charging cable. Using the monitoring of the temperature, it is according to this prior art possible to compensate for ageing or corrosion-related defects within the cable set which connects the electric vehicle to the charging station. To this end, inside the connector device which connects the cable set to the electric vehicle or the charging station, there is provided an encoding means by means of which the value of the amperage which can be transferred via the charging cable can be encoded. This encoding means is controlled in accordance with a temperature detection means, in particular a resistance, so that a temperature-corrected encoding value can be output by the encoding means.

The temperature in the cable set is dependent on the amperage and the transmission resistance of the cable set or the energy cable which is contained therein. The resistance may, for example, be increased by a defect in the cable or corrosion which leads to an increased power loss on the transfer path. This increased power loss leads to overheating of the cable. In order to prevent this, the prior art proposes configuring the connector of the cable in such a manner that it prevents an excess current leading to temperature-related damage of the cable.

Using the method known from the prior art, it is possible to reduce the charging power in accordance with temperature. However, it is not possible to shorten the charging time by excessively increasing the charging current beyond a continuous current. Using the connector known from the prior art, it is only possible to prevent destruction of a cable by reducing the power loss.

SUMMARY OF THE INVENTION

An object of the subject-matter was consequently to increase the power output of a charging station beyond the continuous power rating without permanently damaging the electrical components in the charging station.

This object is achieved with a method according to claim 1.

In order to achieve a reduction of the charging time, the charging current respectively the charging power is to be selected to be as high as possible. A charging station is generally configured for a continuous current in such a manner that, when the charging station is permanently loaded with this continuous current determined in this manner, no damage occurs to the electrical components of the charging station. The continuous power rating is determined by the component/the structural component within the charging station which becomes the most heated and consequently forms the greatest potential risk for a thermal overload of the charging station.

In a charging station which preferably has a compact structure, a large number of components are installed and each themselves produce a power loss. This power loss is dependent on the charging current and leads to heating of the charging station per se. When the charging station, as is preferably possible, operates without any active cooling, consequently has only a passive cooling, overheating of a component may lead to destruction of the charging station. A passive cooling is preferably carried out exclusively by means of convection, in particular by means of discharge of thermal power loss to the ambient air.

Nonetheless, with these charging stations, a brief loading above the continuous power rating is also possible without the components becoming damaged. The potential duration of this overload is dependent on different factors. On the one hand, the age of the components in the charging station is involved since the power loss generally increases as the components become older. On the other hand, the ambient temperature may, for example, also be involved since the passive cooling of the charging station is decisively dependent on the ambient temperature.

On the whole, it has been determined in this objective regard that it is possible to negotiate between the electric vehicle and the charging station a charging power which is above the continuous power rating.

A maximum power which is above the continuous power rating is in particular determined by the maximum current-carrying capacity of the components within the charging station. The component which has the smallest current-carrying capacity determines the maximum current and consequently the maximum power.

In order to shorten the charging duration, it is proposed to first negotiate a charging power which is above the continuous power rating and which at most corresponds to the maximum power. After this charging power has been negotiated, the charge control device of the electric vehicle charges the battery of the electric vehicle in accordance with the negotiated charging power.

During the charging operation, the temperature in the charging station is monitored. To this end, an NTC or a PTC resistor may be arranged in the charging station.

Spatially, the temperature sensor will preferably be arranged in an upper third of the charging station, in particular in the upper 10% of the charging station, since the highest temperatures can regularly be determined at that location. It is also possible to arrange the temperature sensor directly on the components or the structural component which has the highest power loss or which has the greatest temperature-sensitivity. In particular, it is this component which will first be subject to temperature-related failure, in particular in the event of excess temperature. The maximum temperature may be the temperature at which it is ensured that none of the components fails or becomes damaged. In particular, the maximum temperature is determined by the component which already fails or becomes damaged at the lowest temperature.

Preferably, a new charging power is negotiated intermittently. In this instance, in addition to the current monitored temperature, the age of individual components and/or the ambient temperature may also be taken into account. The control is preferably carried out in such a manner that, depending on the current temperature line, as for example, the deviation of the temperature from the ambient temperature, the temperature gradient and/or the duration of the deviation of the temperature from the ambient temperature and also, for example, the age of at least individual components, a new charging current is negotiated in each case. In this instance, the control is carried out in such a manner that exceeding the maximum temperature is avoided for as long as possible. The control is consequently not carried out only when the maximum temperature has been reached, but instead already beforehand. In this instance, P, PI and PID controllers are used.

Furthermore, different components may have different temperature failure characteristics. In particular, the failure characteristics of the safely-relevant components, such as, for example, the FI switch or the control device are taken into account with increased priority when the charging power is adjusted. The charging power is always negotiated at which it is ensured that the maximum temperature is not exceeded or temperature-related damage or a temperature-related failure of a preferably safety-relevant component is prevented.

If, when the temperature in the charging station is monitored, it is determined that the temperature is above a first limit temperature, a new charging power which at most corresponds to the continuous power rating is negotiated. Preferably, the newly negotiated charging power is below the continuous power rating in order to bring about a cooling of the charging station so that after the cooling it is possible to charge using at least the continuous power rating but preferably at a power above the continuous power rating. The first limit temperature is preferably below the maximum temperature. It is thereby possible, in the event that the temperature closely approaches the maximum temperature, that is to say, when it reaches the limit temperature, for example, is 10% below the maximum temperature, for a forced downward adjustment of the charging power to below the continuous power rating to be carried out.

According to an embodiment, it is proposed that the maximum power be determined by means of a maximum current-carrying capacity of electrical components of the charging station. As already mentioned, a heat loss is produced in the charging station in different electrical power components. This heat loss can lead to damage of the components of the charging column. The power loss and consequently the heat loss is dependent on the power taken from the vehicle. The power is inter alia determined by the amperage. The higher the current-carrying capacity of a component, the greater the amperage may be in respect of the current which flows via this component. If the amperage exceeds the current-carrying capacity of the component, the component is destroyed. This destruction may be independent of the heat loss.

For this reason, the maximum power is determined at least by the current-carrying capacity of the electrical components of the charging station. The component which has the lowest current-carrying capacity can determine the maximum power. In addition, the current temperature may also be relevant for the maximum power which can be negotiated respectively. Generally, from the current-carrying capacity of the components which determine the maximum power, there will be maintained a safety margin which is preferably 10%, in a particularly preferred manner 20%, below the maximum current-carrying capacity. This represents a safety buffer in order to protect the components from destruction.

Generally, the components within the charging station are sized in such a manner that the maximum power thereof is significantly above the continuous power rating thereof. In particular, the components are sized in such a manner that they can withstand considerably higher temperatures than occur with the continuous power rating. It is consequently proposed that the maximum power between 50% and 100% of the continuous power rating be above the continuous power rating. This means that the charging station can generally provide from 1.5 to 2 times the power determined by the continuous power rating. However, this increased power leads to greater heat losses so that it cannot be provided permanently. In order to enable brief charging at an increased power, however, the continuous power rating can be exceeded.

The continuous power rating is preferably between 22 kW and 44 kW. If a charging station is operated with a charging power which is above the continuous power rating, the charging time can be shortened. As a result of the continuous power rating of the charging station being prevented from having to be increased, which would lead to a considerable additional cost for the components used, the existing charging infrastructure can be used in order to partially produce considerably shorter charging times.

It has been recognised in particular that the charging of a battery at an increased power for a short time can considerably improve the state of charge of the battery. In the first 15 to 30 minutes of a charging operation, the state of charge of an empty battery increases disproportionately so that, for example, after 20 to 30 minutes of charging, a state of charge of 80% of the entire capacity of the battery can be reached, whereas for complete charging, that is to say, for 100% of the charging capacity, a charging for 2 to 4 hours is required. That is to say, in the first 20 to 30 minutes, a large portion of the capacity of the battery is charged and a considerably longer charging period is required only for the last 20% of the charging power.

If it is determined that the temperature is above the ambient temperature and preferably below the limit temperature or the maximum temperature, the charging power is renegotiated. Depending on the temperature interval of the current temperature from the limit temperature or the maximum temperature, the time path of the temperature and the temperature gradient, a new charge power can then be negotiated. Furthermore, when the renegotiated charge power is determined, the age of at least individual components and/or the temperature-dependent failure characteristics of at least individual components can also be taken into account. The closer the temperature is to the limit temperature or the maximum temperature, the smaller the charge power to be negotiated will probably be.

It is also proposed, as already mentioned, that the newly negotiated charging power may also be below the continuous power rating. This leads to the charging station being able to cool more quickly and preferably, when the value falls below a lower limit value, the charging power being able to be renegotiated again. By providing an upper and a lower temperature limit value, a hysteresis of the charge power to be negotiated can be produced.

The control of the charging power can be carried out by means of a P, PI or PID controller. Depending on the controller selected, an oscillation of the measured actual temperature can be damped. By means of appropriate adjustment, it is also possible to prevent the maximum temperature from being exceeded.

The charging power is preferably initially negotiated at the beginning of a charging operation. Whilst the electric vehicle is connected to the charging infrastructure, in particular the charging station, the charging power can preferably be renegotiated constantly, in particular it is possible to constantly signal how high the maximum charging power available is. This signalling or the maximum charging power available can be regularly adapted during a charging operation in progress. In this context, the term constantly may mean at intervals, preferably at regular intervals, for example, once per minute, per 5 minutes, per quarter of an hour and the like.

The signalling of the charging power can be carried out by means of the cable set between the electric vehicle and the charging station. In particular, a pilot conductor of the cable set can be used to this end. On the other hand, it is also possible with respect to the energy conductor of the cable set for the signal to be able to be modulated in accordance with the charging power.

In particular, the signalling of the charging power is carried out by means of a pulse-width-modulated (PWM) signal. The charging power can also be carried out in accordance with the CHADEMO protocol or by means of Power Line Communication (PLC) in particular in accordance with the IEC 15118 Standard. Other types of communication or the communication protocol are also possible and included.

In addition to the temperature monitoring, a time monitoring may be provided. In this instance, it is possible for the charging power which is above the continuous power rating to be able to be present only for a specific period of time which can be predetermined. Consequently, it is possible, after a specific period of time of the charging power which is above the continuous power rating, for a new charging power which at most corresponds to the continuous power rating to be negotiated. This thereby prevents damage which is independent of the temperature of the components with respect to the components by means of a permanent charging power above the continuous power rating.

With charging stations, it is possible for more than one electric vehicle to be able to be connected. For each connection tap within a charging station, an entire charging infrastructure is intended to be provided in the charging station. In order to be able to distribute the maximum power in a uniform manner over the various charging taps of the charging station, the time monitoring is also relevant. The maximum power is thus prevented from being consumed at a charging tap for a relatively long period of time so that, at the other charging tap, a charging power which is above the continuous power rating can be consumed for example, only very briefly or not at all.

As soon as the temperature within the charging station has dropped, in particular below a lower limit temperature, a new charging power which is above the continuous power rating and which at most corresponds to the maximum power can be negotiated.

The methods mentioned above can also be implemented as a computer program or as a computer program which is stored on a storage medium. In this instance, at the charging station side and/or at the vehicle side, a microprocessor for carrying out the respective method steps can be programmed in an appropriate manner by a computer program.

The features of the methods and devices can be freely combined with each other. In particular, features and part-features of the description and/or the dependent and independent claims, even with complete or partial omission of features or part-features of the independent claims, may be independently inventive alone or when freely combined with each other.

The subject-matter is explained in greater detail below with reference to drawings which show embodiments. In the drawings show:

DETAILED DESCRIPTION OF THE INVENTION

Figure 1:
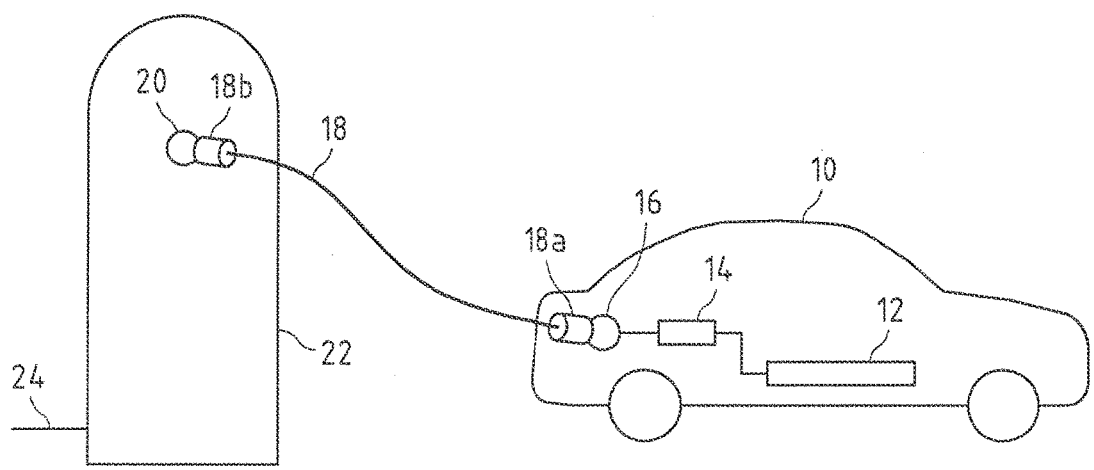
FIG. 1 is a schematic block diagram for the structure of a system comprising an electric vehicle and a charging station which is connected thereto by means of the charging cable.

FIG. 1 shows an electric vehicle 10 which has a battery 12. The battery 12 is preferably charged via a charge control device 14, the charge control device 14 being connected by means of an electrical connection 16 and a charging cable 18 to a tap 20 of the charging station 22. The charging cable 18 has at each of the two ends a plug-type device 18a, 18b, with each plug-type device 18a, 18b having a connector or a socket which can be connected to the corresponding connection 16, 20 of the electric vehicle 10 or the charging station 22.

The charging station 22 is connected to an energy supply network 24 and has internally a charging infrastructure as will be explained in greater detail below with reference to FIG. 2.

The charging cable 18 has power lines, for example, L1, L2, L3, N, PE for the charging current which flows via the charging cable 18 from the charging station 22 to the electric vehicle 10. Furthermore, at least one pilot signal line for transmitting pilot signals may be provided in the charging cable 18. Furthermore, there may be provided a so-called plug present line by means of which the electric vehicle 10 can indicate to the charging station 22 whether a connector is inserted or not.

Figure 2:
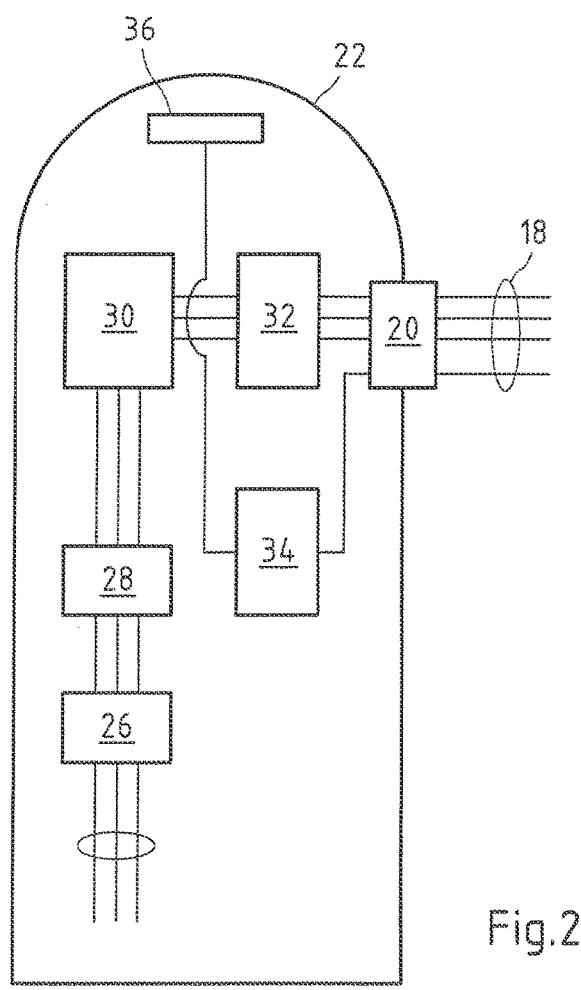
FIG. 2 is a schematic block diagram of a charging infrastructure within a charging station.

The charging infrastructure within the charging station 22 is illustrated in FIG. 2. It can be seen that the charging station 22 is connected, for example, in a 3-phase manner to the energy supply network 24. The three phases L1, L2, L3 are illustrated, the Ground conductor N and the earth conductor PE are not illustrated.

The three phases L1, L2, L3 are first connected via a counter 26 to an FI switch 28. The FI switch 28 is connected to an automatic fuse 30. The output of the automatic fuse 30 is connected to a contactor 32 whose output opens in the connection 20. Within the charging station 22, there is further provided a charge control device 34 via which the contactor 32 can be controlled. The charge control device 34 can consequently switch the charging current on and off via the contactor 32.

An output of the charge control device 34 can be used for signalling of the charge power, in particular this output can be connected to a pilot conductor of the cable 18. Via this pilot conductor, it is possible to negotiate, for example, using a PWM signal, a charge power with the charge control device 14 of the electric vehicle 10.

Each component 26-32 within the charging station 22, in particular the counter 26, the FI switch 28, the automatic fuse 30, the contactor 32 and the charge control device 34, has a separate temperature resistance. If the temperature within the charge station 22 exceeds a maximum temperature, it is possible for at least one of these components 26-32 to become damaged.

The temperature resistance of the components 26-32 may be different so that a maximum temperature within the charging station 22 can be determined by the component whose temperature resistance is lowest.

Furthermore, each component 26, 28, 30, 32 has a maximum current-carrying capacity. This current-carrying capacity determines how high a current may be above this component 26-32 without it being damaged by the current itself. This damage may be independent of the temperature.

The current-carrying capacity can be used to determine a maximum power of the charging station 22. The maximum power determined by the current-carrying capacity of the components 26-32 is generally above the continuous power rating which is generally determined by the temperature resistance of the components 26-32.

A temperature within the charging station 22 can be sensed by means of a temperature sensor 36, in particular a PTC or an NTC resistance. The temperature sensed is supplied to the charge control device 34. The charge control device 34, in accordance with the temperature sensed, may negotiate the charge power with the electric vehicle 10 respectively the charge control device 14 of the electric vehicle 10.

It can be seen that the temperature sensor 36 is arranged in an upper region, in particular in the upper 10% of the charging station 22. The heat loss of the components 26-34 is discharged through these to the ambient air. Inside the charging station 22, the air which is heated in this manner rises upwards so that, in the region of the temperature sensor 36 or in the upper region of the charging station 22, the highest temperature will be measured.

However, it is also possible for there to be provided on each component 26-34 a separate temperature sensor by means of which more individual monitoring of the temperature is possible and it may, for example, be possible to provide the maximum power for a longer period of time since the respective components 26-34 per se have not yet reached their maximum temperature.

In this regard, it has been recognised that the state of charge of a battery 12 can be improved at the beginning of a charging operation considerably more quickly than at the end of the charging operation. In particular, it is possible, by means of a very high charging power at the beginning of a charging operation, to bring the state of charge (SOC) of the battery 14 up to 70-80% of the total capacity in a short time. This is illustrated by way of example in FIG. 3.

Figure 3:
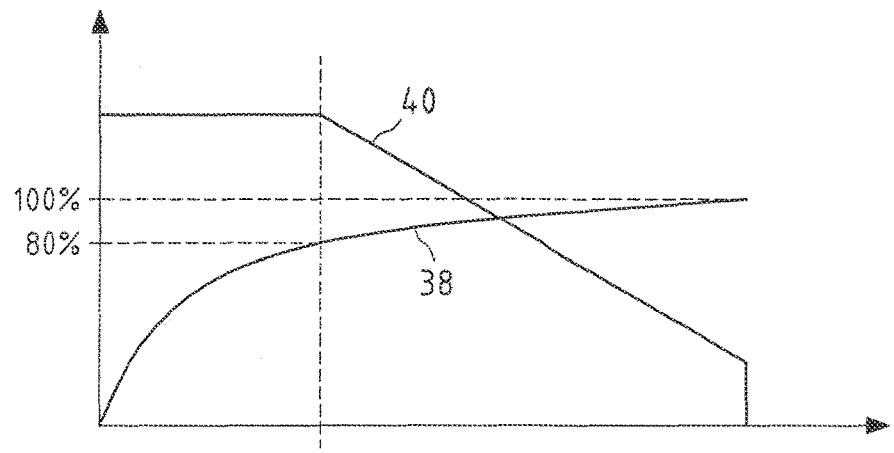
FIG. 3 shows the slope of a charging curve in accordance with a charging power of a battery of an electric vehicle.

FIG. 3 shows the curve of the soc of the battery 12 at the line 38 and the curve of the charge amperage at the line 40. The ordinate shows the charge current or the charge state and the abscissa shows the time.

In FIG. 3, it can be seen that the soc of the battery 12 approaches 100% as time increases. On the other hand, it can be seen that, at the beginning of a charging operation, the soc increases disproportionately and the soc of 80% can be reached very quickly. In order to promote this disproportionate increase of the soc, the charge amperage should be selected to be as large as possible at the beginning of a charging operation. This is illustrated by the line 40. When an method according to the subject matter is used, the charge amperage at the beginning of the charging operation is greater than would be made possible by the continuous power rating of the charging station 22. After a short period of time, for example, 30 minutes, the charge amperage is lowered. If the temperature within the charging station 22 exceeds a limit value, a lowering of the charge amperage may already take place beforehand.

Figure 4:
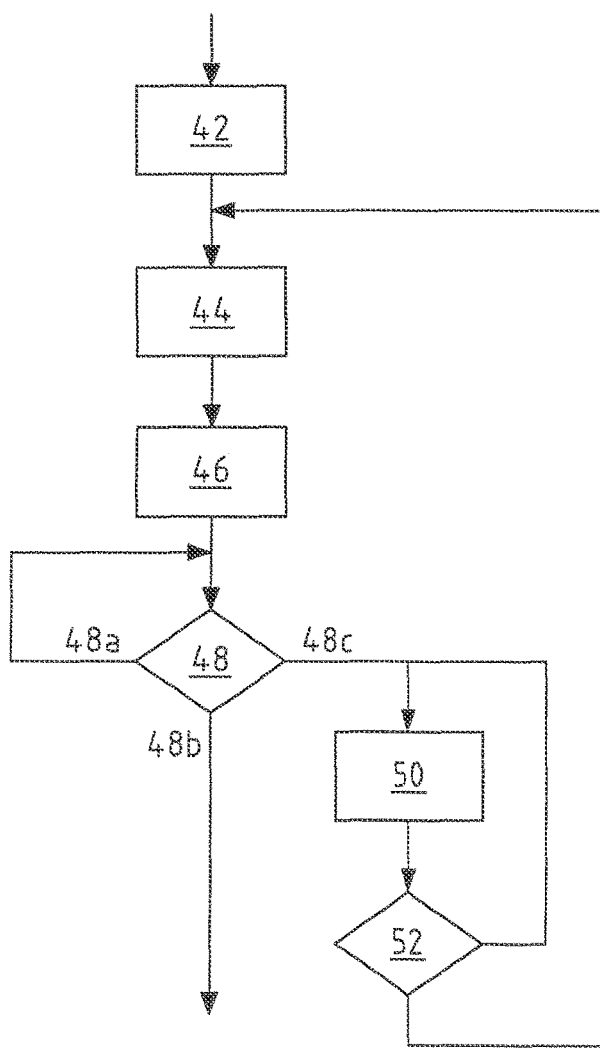
FIG. 4 shows the sequence of an objective method.

FIG. 4 shows the sequence of a method according to the subject matter.

The electric vehicle 10 is first connected (42) to the charging station 22 via the cable 18.

After the electrical connection has been tested, a charging power is negotiated (44) between the charge control device 14 and the charge control device 34 via the pilot conductor by means of a pulse width modulated signal. This charging power which is initially negotiated is in this instance above the continuous power rating which is specified for the charging station 22. After the charging power has been negotiated (44), the charging current is released (46) by the charge control device 34 by means of a command to the contactor 32.

The contactor 32 closes and, via the lines of the cable 18, the charge current flows via the charge current device 14 of the electric vehicle 10 to the battery 12. Subsequently, dual monitoring is carried out. The charge control device 34 monitors by means of the temperature sensor whether the temperature within the charging station 22 exceeds a limit value. It is further monitored whether the charging current or the charging power, which is transmitted via the cable 18, corresponds to the negotiated charging power. This monitoring is carried out in step 48.

If the temperature is below the limit temperature or the maximum temperature and if the charging power which is negotiated is not exceeded, according to the sequence 48a the monitoring 48 is continued.

If the charging power exceeds the negotiated charging power, step 48b of the charging operation is accordingly ended by the charge control device 34 opening the contactor 32.

If the temperature within the charging station 22 rises, and if the distance of the actual temperature from the ambient temperature increases, according to the instruction 48c, a new charging power can be negotiated (50) between the charge control device 34 and the charge control device 14. The control of the charging power to be negotiated can be carried out by means of a P, PI or PID controller.

Subsequently, the temperature within the charging station 2 is monitored (52). If the temperature continues to be above the ambient temperature, there is a return to step 50 and where applicable a lower or also higher charging power is negotiated.

If the temperature is below the ambient temperature, step 44 is selected and a new charging power is again negotiated and may be above the continuous power rating where applicable.

Using the method, according to the subject matter it is possible to considerably shorten the charging time for charging an electric vehicle, without the components within a charging station having to be configured for higher power levels. This leads to more efficient use of existing charging infrastructure.

The invention claimed is:

1. A method for operating a charging station for electric vehicles, in which
   a charging power is negotiated between a charge control device of the electric vehicle and the charging station and
   the charge control device controls a charging current which is transmitted from the charging station to the electric vehicle in accordance with the charging power negotiated,
   wherein a continuous power rating and a maximum power of the charging station which is greater than the continuous power rating are determined, wherein
   a charging power which is above the continuous power rating and which at most corresponds to the maximum power is first negotiated,
   in that a temperature in the charging station is monitored, and
   in that a new charging power is negotiated in accordance with the temperature.

2. The method according to claim 1, wherein, upon exceeding a limit temperature is exceeded, a new charging power which at most corresponds to the continuous power rating is negotiated.

3. The method according to claim 1, wherein the maximum power is determined by a maximum current-carrying capacity of electrical components of the charging station.

4. The method according to claim 1, wherein the maximum power between 50% and 100% of the continuous power rating is above the continuous power rating, wherein the continuous power rating is preferably between 22 kW and 44 kW.

5. The method according to claim 1, wherein the renegotiated charging power is below the continuous power rating.

6. The method according to claim 1, wherein the charging power is controlled in accordance with the temperature in the charging station, wherein the control is carried out by a P controller in a proportional manner, a PI controller in a proportional manner and integrally or a PID controller in a proportional, integral and differential manner.

7. The method according to claim 1, wherein the charging power is negotiated at the beginning of a charging operation and/or several times again during a charging operation.

8. The method according to claim 1, wherein the charging power is negotiated by a pilot conductor or an energy conductor in the cable set which connects the charging station to the electric vehicle.

9. The method according to claim 1, wherein, after a specific period of time of the charging power which is above the continuous power rating, a new charging power which at most corresponds to the continuous power rating is negotiated.

10. The method according to claim 1, wherein, when the temperature falls below a limit temperature, a new charging power which is above the continuous power rating and which at most corresponds to the maximum power is negotiated.

* * * * *